(12) United States Patent
Antony et al.

(10) Patent No.: US 10,476,845 B2
(45) Date of Patent: *Nov. 12, 2019

(54) TRAFFIC HANDLING FOR CONTAINERS IN A VIRTUALIZED COMPUTING ENVIRONMENT

(71) Applicant: Nicira, Inc., Palo Alto, CA (US)

(72) Inventors: Jinto Antony, Bangalore (IN); Saju Chengat, Bangalore (IN); Hariharan Jeyaraman Ganesan, Bangalore (IN); Madhusudhanan Gangadharan, Bangalore (IN)

(73) Assignee: NICIRA, INC., Palo Alto, CA (US)

(*) Notice: Subject to any disclaimer, the term of this patent is extended or adjusted under 35 U.S.C. 154(b) by 73 days.

This patent is subject to a terminal disclaimer.

(21) Appl. No.: 15/663,814

(22) Filed: Jul. 30, 2017

(65) Prior Publication Data
US 2017/0353433 A1   Dec. 7, 2017

Related U.S. Application Data

(63) Continuation-in-part of application No. 14/857,851, filed on Sep. 18, 2015, now Pat. No. 9,722,948.

(30) Foreign Application Priority Data

Jun. 26, 2015   (IN) .......................... 3244/CHE/2015

(51) Int. Cl.
*H04L 29/06* (2006.01)
*H04L 12/801* (2013.01)
*H04L 12/931* (2013.01)
*H04L 12/927* (2013.01)

(52) U.S. Cl.
CPC .......... *H04L 63/0245* (2013.01); *H04L 47/10* (2013.01); *H04L 47/805* (2013.01); *H04L 49/70* (2013.01); *H04L 63/0263* (2013.01); *H04L 63/1416* (2013.01); *H04L 63/20* (2013.01)

(58) Field of Classification Search
None
See application file for complete search history.

(56) References Cited

U.S. PATENT DOCUMENTS

| | | |
|---|---|---|
| 9,225,772 B2 | 12/2015 | Lui et al. |
| 9,722,948 B2 | 8/2017 | Antony et al. |
| 2010/0054129 A1 | 3/2010 | Kuik et al. |
| 2015/0358433 A1 | 12/2015 | Parthasarathy et al. |
| 2016/0080207 A1 | 3/2016 | Prakash et al. |
| 2016/0269318 A1 | 9/2016 | Su et al. |
| 2016/0335129 A1 | 11/2016 | Behera et al. |
| 2016/0359915 A1 | 12/2016 | Gupta et al. |

*Primary Examiner* — Brian S Roberts
(74) *Attorney, Agent, or Firm* — SU IP Consulting

(57) ABSTRACT

An example method is provided for a computing device to perform traffic handling for a container in a virtualized computing environment. The method may comprise receiving a traffic flow of packets from a virtual machine and identifying a container from which the traffic flow originates based on content of the received traffic flow of packets. The container may be supported by the virtual machine. The method may further comprise retrieving a policy configured for the identified container and handling the received traffic flow of packets according to the policy.

21 Claims, 12 Drawing Sheets

| | Container Name | Container ID | IP address | Container Shares Value | Container Limit Value (Mbps) | Container Reservation Value (Mbps) | Container Tag | VM ID | VM Shares Value | VM Limit Value (Mbps) | VM Reservation Value (Mbps) |
|---|---|---|---|---|---|---|---|---|---|---|---|
| | 317 | 318 | 320 | 322 | 324 | 326 | 328 | 330 | 332 | 334 | 336 |
| 311 | CON1 | C1 | 172.17.42.1 | 50 | 500 | 120 | TAG1 | VM1 | 100 | 2000 | 1000 |
| 312 | CON2 | C2 | 172.17.42.2 | 20 | 800 | 100 | TAG2 | VM1 | 100 | 2000 | 1000 |
| 313 | CON3 | C3 | 172.17.42.3 | 10 | 100 | 30 | TAG3 | VM1 | 100 | 2000 | 1000 |
| 314 | CON4 | C4 | 172.17.42.4 | 80 | 600 | 20 | TAG4 | VM2 | 50 | 1500 | 500 |
| 315 | CON5 | C5 | 172.17.42.5 | 100 | 800 | 100 | TAG5 | VM2 | 50 | 1500 | 500 |
| 316 | CON6 | C6 | 172.17.42.6 | 20 | 800 | 20 | TAG6 | VM2 | 50 | 1500 | 500 |

| (Container ID, Tag) | Source PN | Dest IP | Dest PN | Service | Action | |
|---|---|---|---|---|---|---|
| (C1, TAG1) | Any | IP-DEST1 | 443 | HTTPS | ALLOW | 1211 |
| (C1, TAG1) | Any | IP-DEST2 | Any | TCP | DENY | 1212 |
| (C2, TAG2) | Any | IP-DEST3 | Any | HTTPS | ALLOW | 1213 |
| (C2, TAG2) | Any | IP-DEST4 | Any | UDP | DENY | 1214 |
| (C3, TAG3) | Any | IP-DEST1 | Any | UDP | ALLOW | 1215 |
| (C4, TAG4) | Any | IP-DEST5 | 80 | TCP | ALLOW | 1216 |
| (C5, TAG5) | Any | IP-DEST6 | 443 | HTTPS | ALLOW | 1217 |
| (C6, TAG6) | Any | IP-DEST7 | Any | UDP | DENY | 1218 |

FIG. 12

TRAFFIC HANDLING FOR CONTAINERS IN A VIRTUALIZED COMPUTING ENVIRONMENT

CROSS-REFERENCE TO RELATED APPLICATION

This application is a continuation-in-part of U.S. patent application Ser. No. 14/857,851, filed Sep. 18, 2015, which claims priority to Indian Patent Application No. 3244/CHE/2015, filed Jun. 26, 2015. The U.S. Patent Application and the Indian Patent Application, including any appendices or attachments thereof, are incorporated by reference herein in their entirety.

BACKGROUND

Unless otherwise indicated herein, known approaches described are not admitted to be prior art by inclusion throughout the present disclosure.

Virtualization allows the abstraction and pooling of hardware resources to support virtual machines in a virtualized computing environment. For example, through server virtualization, virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. Virtualization software (e.g., hypervisor) running on the physical machine is generally used to maintain a mapping between the virtual resources allocated to each virtual machine and the underlying physical resources of the physical machine.

In practice, since a single physical machine can support tens to hundreds of virtual machines, it can be challenging to manage the sharing of physical resources (e.g., network resources) among different virtual machines, and different applications supported by each virtual machine.

BRIEF DESCRIPTION OF DRAWINGS

FIG. 3 illustrates an example table of QoS policies configured for the containers in the example virtualized computing environment in FIG. 1;

FIG. 12 illustrates an example table of firewall policies configured for the containers in the example virtualized computing environment in FIG. 1.

DETAILED DESCRIPTION

Figure 1:
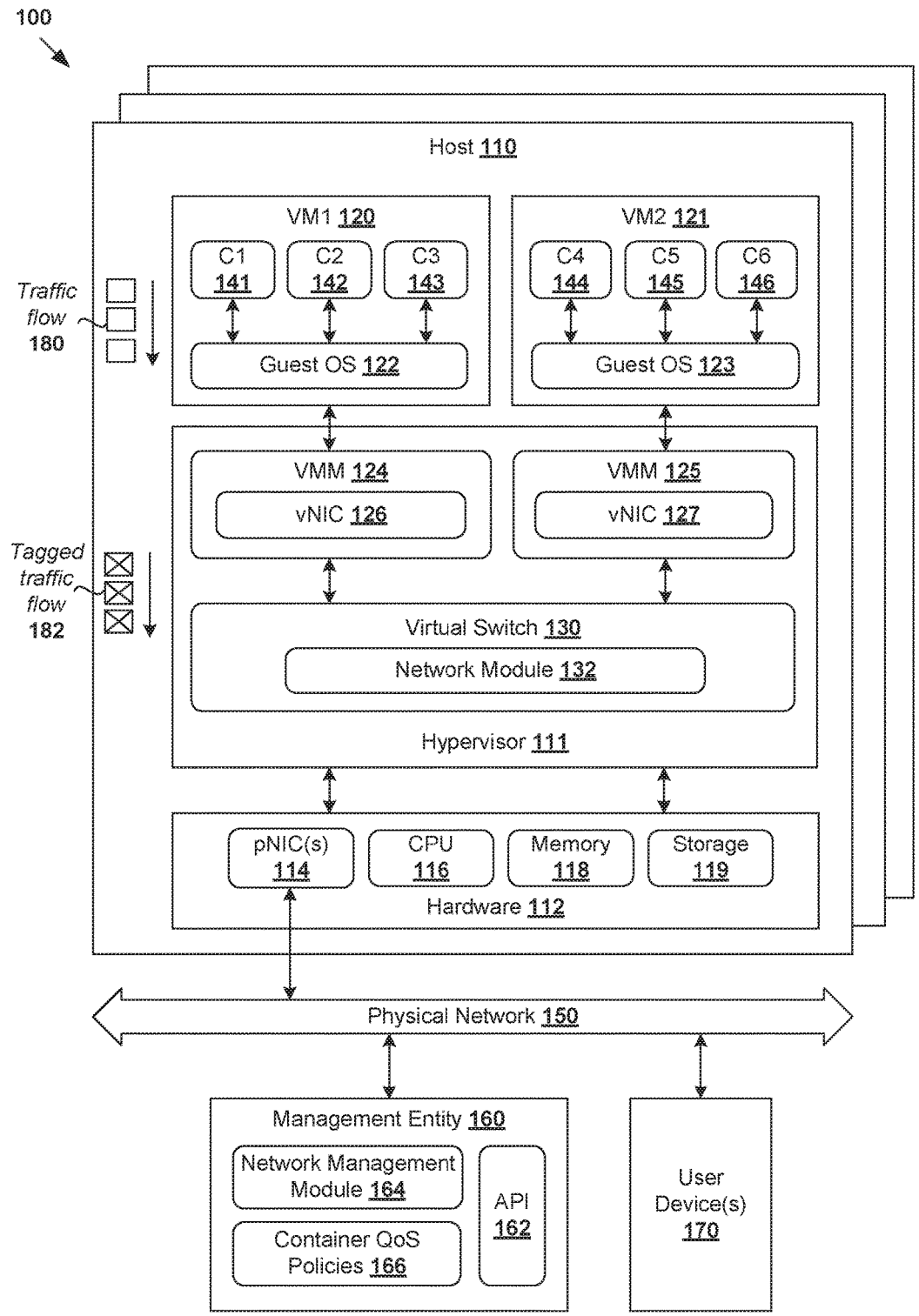
FIG. 1 is a schematic diagram illustrating an example virtualized computing environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

The challenges in managing the sharing of physical resources, and particularly network resources, in a virtualized computing environment will now be further explained using FIG. 1, which is a schematic diagram illustrating example virtualized computing environment 100. Although an example is shown, it should be understood that virtualized computing environment 100 may include additional or alternative components, and each component may have a different configuration depending on the desired implementation.

Virtualized computing environment 100 includes hosts 110 (also known as "computing devices", "host computers", "host devices", "physical servers", "server systems", etc.) that are connected to management entity 160 and user device(s) 170 via physical network 150. Each host 110 includes virtualization software (e.g., hypervisor 111) and suitable hardware 112 to support virtual machines, such as "VM1" 120 and "VM2" 121. Although one host 110 and two virtual machines 120, 121 are shown for simplicity, there may be multiple hosts 110, each supporting tens or hundreds of virtual machines in practice.

Hypervisor 111 maintains a mapping between underlying hardware 112 of host 110 and virtual resources allocated to virtual machines "VM1" 120 and "VM2" 121. For example, hardware 112 includes components such as physical network interface controller (NIC) 114 to provide access to physical network 150; Central Processing Unit (CPU) 116, memory 118 (e.g., random access memory) and storage disk 119 (e.g., solid state drive, hard disk drive), etc. Although one is shown for simplicity, host 110 may include any suitable number of physical NIC 114 (also known as physical network adapters).

Virtual machines 120, 121 each represent a software implementation of a physical machine. Virtual resources are allocated to virtual machines 120, 121 to support respective guest operating systems 122, 123 and applications (e.g., containers that will be explained below), etc. For example, corresponding to hardware 112, the virtual resources may include virtual CPU, virtual memory, virtual disk, virtual network interface controller (vNIC), etc. Hardware resources may be emulated using virtual machine monitors (VMMs) implemented by hypervisor 111. For example, VMM 124 is to emulate vNIC 126 to provide network access for "VM1" 120 and similarly, VMM 125 to emulate vNIC 127 for "VM2" 121. In practice, VMMs 124, 125 may be considered as components that are part of "VM1" 120 and "VM2" 121, or alternatively, separated from "VM1" 120 and "VM2" 121. In both cases, VMMs 124, 125 maintain the state of respective vNICs 126, 127. When virtual machines 120, 121 are migrated, data relating to the state is also migrated.

Hypervisor 111 further implements virtual switch 130 to handle traffic forwarding from and to "VM1" 120 and "VM2" 121. For example, virtual switch 130 may include any suitable network module 132 to handle egress traffic (may also be referred to as "outgoing traffic") and ingress traffic (may also be referred as "incoming traffic"). The egress traffic is received by virtual switch 130 from "VM1" 120 via vNIC 126 or "VM2" 121 via vNIC 127 for forwarding to physical network 150 via physical NIC 114. The ingress traffic is received by virtual switch 130 from physical network 150 via physical NIC 114 for forwarding to "VM1" 120 via vNIC 126 or "VM2" 121 via vNIC 127. As used herein, the term "traffic" may refer generally to a group of bits that can be transported together from a source to a destination, such as in the form of "packets", "frames", "messages", "datagrams", etc. Physical network 150 may be any suitable network, such as wide area network, virtual private network, etc.

Management entity 160 provides management functionalities to manage various components in virtualized computing environment 100, such as hosts 110, virtual machines "VM1" 120, "VM2" 121, etc. In practice, management entity 160 may be implemented by one or more virtual or physical entities. Users (e.g., network administrators) operating user devices 170 may access the functionalities of management entity 160 via any suitable interface (e.g., graphical user interface, command-line interface, etc.) and/or Application Programming Interface (API) calls via physical network 150. For example, Representational State Transfer (REST) API may be used to create, modify or delete objects defined by API module 162 using Hyper Text Transfer Protocol (HTTP) requests. User device 170 may be any suitable computing device, such as user workstation, client device, mobile device, etc.

In virtualized computing environment 100, container technologies may be used to run various containers inside virtual machines 120, 121. As used herein, the term "container" (also known as "container instance") is used generally to describe an application that is encapsulated with all its dependencies (e.g., binaries, libraries, etc.). For example, containers "C1" 141, "C2" 142 and "C3" 143 are executed as isolated processes on guest OS 122 inside "VM1" 120. Similarly, "C4" 144, "C5" 145 and "C6" 146 are executed as isolated processes on guest OS 123 inside "VM2" 121. Any suitable networking drivers may also be installed on "VM1" 120 and "VM2" 121 (e.g., vmxnet, vmxnet3, etc.) to interface with the containers.

Containers "C1" to "C6" may be implemented using any suitable container technology, such as Docker, Linux, etc. Unlike conventional virtual machines that have one OS per virtual machine, containers "C1" to "C6" are "OS-less", meaning that they do not include any OS that could weigh 10s of Gigabytes (GB). This makes containers "C1" to "C6" more lightweight, portable, efficient and suitable for delivery into an isolated OS environment. Running containers inside a virtual machine (known as "containers-on-virtual-machine" approach) not only leverages the benefits of container technologies but also that of virtualization technologies.

However, the use of container technologies presents a new problem in virtualized computing environment 100. Conventionally, it is not possible to differentiate traffic originating from different containers supported by the same virtual machine, or containers supported by different virtual machines. For example in FIG. 1, containers "C1", "C2" and "C3" are all supported by "VM1" and sends packets via vNIC 126, virtual switch 130 and physical NIC 114. Although containers "C1", "C2" and "C3" are run as isolated processes at "VM1", packets from these containers would appear to virtual switch 130 to have originated from "VM1". The same problem may be observed for containers "C4", "C5" and "C6" that run inside "VM2" and share access to vNIC 127.

As such, in existing systems, it is impossible for host 110 to manage the individual network bandwidth usage of different containers running inside virtual machines. This is undesirable because some containers may be starved of network bandwidth while others dominate. Further, since it is impossible for differentiate traffic to or from different containers in existing systems, it is also impossible for host 110 to perform different types of traffic handling for different containers.

Quality of Service (QoS) for Containers

According to examples of the present disclosure, Quality of Service (QoS) may be provided to containers (e.g., "C1" to "C6") in virtualized computing environment 100. For example, to provide QoS for "C1" running inside "VM1" in FIG. 1, a QoS policy may be configured for "C1". When a traffic flow of packets is received from "VM1", "C1" may be identified based on content in the packets and forwarded according to the QoS policy. This "container-aware" approach supports QoS policy configuration and traffic flow differentiation to partition network bandwidth among different containers from the same virtual machine or different virtual machines.

As used herein, QoS is a term of art that is well understood by those in the field of network bandwidth management. It may include concepts such as bandwidth reservations, weighted shares, and limits imposed on individual network bandwidth consumers (e.g., containers, virtual machines), etc. U.S. Pat. No. 9,019,826 issued to Jean-Pascal Billaud, et al., is fully incorporated by reference herein to explain possible features and certain implementation details of an example QoS management component.

Figure 2:
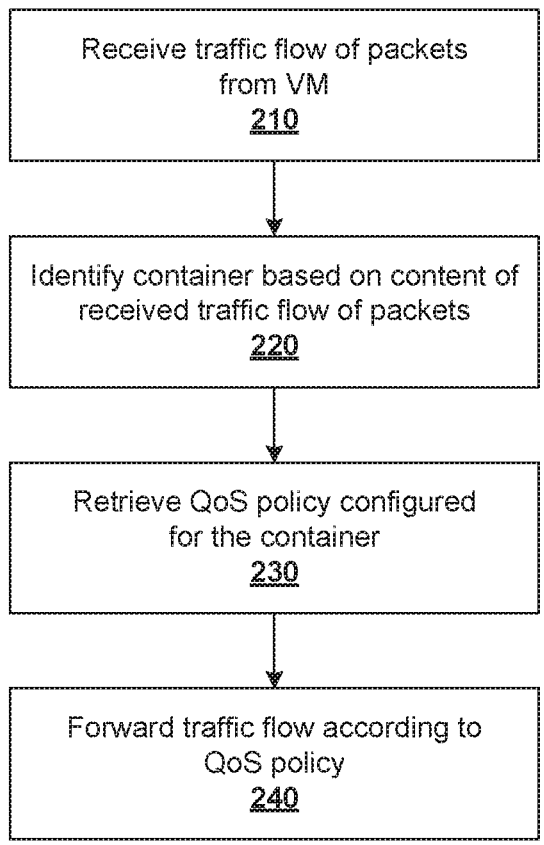
FIG. 2 is a flow chart of an example process to provide Quality of Service (QoS) for containers in a virtualized computing environment.

In more detail, FIG. 2 is a flow chart of an example process 200 to provide QoS for containers in virtualized computing environment 100. Example process 200 may include one or more operations, functions, or actions illustrated by one or more blocks, such as blocks 210 to 240. The various blocks may be combined into fewer blocks, divided into additional blocks, and/or eliminated based upon the desired implementation.

In practice, example process 200 may be implemented using any suitable computing device. In one example, example process 200 may be implemented by host 110, such as using hypervisor 111 that implements virtual switch 130 and network module 132, etc. Depending on the desired implementation, hypervisor 111 may implement example process 200 by interacting with management entity 160 (e.g., with network management module 164 and container QoS policies 166).

At 210 and 220 in FIG. 2, when a traffic flow of packets is received from a virtual machine (e.g., "VM1"), a container (e.g., "C1") supported by the virtual machine (e.g., "VM1") from which the traffic flow originates is identified. The container (e.g., "C1") may be identified based on content of the received traffic flow of packets.

As will be described using FIG. 5, FIG. 6 and FIG. 7, traffic flow differentiation may be implemented based on tag data added to packets originating from the container (e.g., "C1"). For example in FIG. 1, when "C1" sends a traffic flow of packets (see 180), "VM1" may add tag data to the header data of each packet to generate tagged traffic flow (see 182). Different tag data may be used for different containers, such as "TAG1" for "C1", "TAG2" for "C2", "TAG4" for "C4", and so on. The tag data may be added using any suitable approach.

In one example, a guest agent (not shown for simplicity) that hooks onto a network stack of guest OS 122 may be used to add the tag data. The guest agent may be installed on guest OS 122 as part of a suite of utilities (e.g., known as "VM tools") for enhancing the performance of virtual machine 120, 121. In another example, container (e.g., "C1") add the tag data to its packets, in which case traffic flow 182 in FIG. 1 also represents a tagged traffic flow.

At 230 and 240 in FIG. 2, a QoS policy configured for the identified container (e.g., "C1") is retrieved and the received traffic flow forwarded according to the QoS policy. Here, the term "retrieved" is used to include hypervisor 111 retrieving the QoS policy from local storage on host 110, or from management entity 160 (e.g., via network management module 164 if the QoS policy is not available locally). The QoS policy configured for the container (e.g., "C1") may specify a network bandwidth allocation for the container, such as based on a network resource pool associated with the virtual machine (e.g., VM1") supporting the container.

As used herein, the term "network resource pool" is used to refer generally to a set of network resources (e.g., network bandwidth) allocated to the virtual machine (e.g., "VM1"). Example QoS policies will be explained in more detail using FIG. 3 and FIG. 4. In practice, QoS policies may be configured using any suitable approach, such as by a user (e.g., network administrator) who interacts with management entity 160 using user device 170, programmatically using a script, etc. As will be described further using FIG. 5 and FIG. 6, another approach is to automatically configure the QoS policies as containers are started. Using QoS policies, prioritization may be enforced to reduce the likelihood of a traffic flow from one container dominating over that of others.

Since container traffic may be one of the most common traffic types in the future, example process 200 facilitates seamless network bandwidth management when container technology is used in virtualized computing environment 100. In particular, using example process 200, host 110 is able to support container traffic isolation and container QoS provisioning. Example process 200 may be performed to differentiate traffic flows from containers (e.g., "C1" to "C3") supported by the same virtual machine (e.g., "VM1") or from containers (e.g., "C1" to "C6") supported by different virtual machines (e.g., "VM1" and "VM2").

In the following, various examples will be discussed with reference to FIG. 3 to FIG. 9. In particular, example QoS policies will be explained using FIG. 3 and FIG. 4, example processes for starting a container using FIG. 5 and FIG. 6, example process for traffic forwarding using FIG. 7 and FIG. 8, and example implementation in a distributed virtual switch using FIG. 9.

Example QoS Policies

FIG. 3 illustrates example table 300 of QoS policies 311-316 configured for containers in example virtualized computing environment 100 in FIG. 1. FIG. 3 will be explained with reference to FIG. 4, which is a schematic diagram illustrating subdivisions of network resource pools according to example QoS policies 311-316 in FIG. 3. In the following examples, containers "C1" to "C6" are configured with respective QoS policies 311-316. It should be understood, however, that it is not always necessary for each and every container to be configured with a QoS policy. For example, container "C6" may not require any QoS policy if it is merely implementing an application that runs as a background task or it does not require network access.

Referring to the columns of table 300, each container is associated with container name (see "CON1" to "CONE" at 317); container identifier (ID) such as a 64 hexadecimal digit string (see "C1" to "C8" at 318); Internet Protocol (IP) address to communicate with the outside world (see 320); container share, limit and reservation values (see 322, 324, 326); container tag data (see 328) and data relating to a network resource pool of associated virtual machine (see 330, 332, 334, 336). QoS policies 311, 312, 313 are configured to specify respective network bandwidth allocations for "C1", "C2" and "C3" sharing the network resource pool of "VM1", and QoS policies 314, 315, 316 to specify respective network bandwidth allocations for "C4", "C5" and "C6" sharing the network resource pool of "VM2". QoS policies 311-316 may be retrieved based on container name 317, container ID 318, container tag data 328, etc.

The network resource pool of a virtual machine (see 330) may be defined using one or more of the following: (1) virtual machine shares value=Sv that specifies a network bandwidth allocation priority given to a virtual machine relative to at least one other virtual machine (see 332); (2) virtual machine limit value=Lv that specifies a maximum network bandwidth allocation for the virtual machine (see 334); and (3) virtual machine reservation value=Rv that specifies a minimum network bandwidth allocation guaranteed for the virtual machine (see 336). Virtual machine limit and reserved values may be expressed in data transfer rate, such as Megabits per second (Mbps).

The QoS policy configured for each container may be defined using one or more of the following: (1) container shares value=Sc that specifies a network bandwidth allocation priority given to the container relative to at least one other container sharing a virtual machine's network resource pool (see 322); (2) container limit value=Lc that specifies a maximum network bandwidth allocation for the container (see 324); and (3) container reservation value=Rc that specifies a minimum network bandwidth allocation guaranteed for the container (see 326). The container limit value cannot exceed the virtual machine limit value (i.e., Lc≤Lv) and container reservation value cannot exceed the virtual machine reservation value (i.e., Rc≤Rv). Container limit and reserved values may be expressed in data transfer rate, such as Mbps.

As used herein, the term "shares" or "shares value" is used generally to describe the relative importance or priority of a traffic flow compared to at least one other traffic flow. Shares may be specified in absolute units with a value ranging from 1 to 100 to provide a greater flexibility for unused network bandwidth redistribution. For example in FIG. 3 (see 332), "VM1" with shares=100 is given a higher priority than "VM2" with shares=50. This means that if there is spare bandwidth of 600 Megabits per second (Mbps) during periods of network resource contention, "VM1" may be allocated with up to 400 Mbps (i.e., 100/150=67%) and "VM2" with 200 Mbps (i.e., 50/150=33%) provided respective virtual machine limit values (see 334) are not exceeded. See corresponding representations 410 for "VM1" and 420 for "VM2" in FIG. 4.

For the containers, QoS policy 311 is configured to allocate "C1" with shares =50; QoS policy 312 to allocate "C2" with shares=20; and QoS policy 313 to allocate "C3" with shares=10. In this case, "C1" with shares=50 is given a higher network bandwidth allocation priority over "C2" with shares=20 and "C3" with shares=10 (i.e., lowest priority in this example). During periods of network resource contention, "C1" may be allocated with up to 63% (i.e., 50/80), "C2" 25% (i.e., 20/80) and "C3" 13% (i.e., 10/80) of the network bandwidth available for "VM1", provided respective container limit values (see 324) are not exceeded. See corresponding representations 432 for "C1", 434 for "C2" and 436 for "C3" in FIG. 4.

Similarly, QoS policy 314 is configured to allocate "C4" with shares=80; QoS policy 315 to allocate "C5" with shares=100; and QoS policy 316 to allocate "C6" with shares=20. In this case, "C5" with shares=100 will be given a higher network bandwidth allocation priority over "C4" with shares=80 and "C6" with shares=20 (i.e., lowest priority in this example). During periods of network resource contention, "C4" may be allocated with up to 40% (i.e., 80/200), "C5" 50% (i.e., 100/200) and "C6" 10% (i.e., 20/300) of the network bandwidth available for "VM2", provided the respective container limit values (see 324) are not exceeded. See corresponding representations 444 for "C4", 442 for "C5" and 446 for "C6" in FIG. 4.

The term "limit" or "limit value" is used to generally describe a maximum network bandwidth allocation (e.g., maximum permitted data transfer rate). In the example in FIG. 3 (see 334), "VM1" has a higher limit=2000 Mbps compared to 1500 Mbps for "VM2". For containers supported by "VM1", QoS policy 312 allocates "C2" with limit=800 Mbps, which is higher than limit=500 Mbps allocated to "C1" (see 311) and limit=100 Mbps allocated to "C3" (see 313). Similarly for "VM2", QoS policy 314 allocates "C4" with limit=600 Mbps, which is lower than limit=800 Mbps allocated to "C5" (see 315) and "C6" (see 316).

In practice, the virtual machine limit value=Lv (e.g., 2000 Mbps for "VM1") cannot be less than the virtual machine reservation value=Rv, (e.g., 1000 Mbps for "VM1"). Similarly, the container limit value=Lc (e.g., 500 Mbps for "C1") cannot be less than the container reservation value=Rc (e.g., 120 Mbps for "C1"). If the limit is exceeded, packets can be dropped, even if there is bandwidth available at physical NIC 114. Since limit values 324, 334 are hard boundaries, "C1" is allowed to transmit up to 500 Mbps even when "C2" and "C3" are not transmitting. Similarly, "VM1" is only allowed up to 2000 Mbps even when "VM2" is not transmitting.

The term "reservation" or "reservation value" is used to generally describe a guaranteed minimum network bandwidth allocation. Reservation, for example, is useful for time-sensitive traffic flow (e.g., voice, video, etc.) that requires a minimum data transfer rate. For containers supported by "VM1" with reservation=1000 Mbps, "C1" is allocated with reservation=120 Mbps (see QoS policy 311), "C2" with reservation=100 Mbps (see QoS policy 312) and "C3" with reservation=30 Mbps (see QoS policy 313). Similarly for "VM2" with reservation=500 Mbps, "C4" is allocated with reservation =20 Mbps (see QoS policy 314), "C5" with reservation=100 Mbps (see QoS policy 315) and "C6" with reservation=20 Mbps (see QoS policy 316). The sum of all container reservation values (e.g., 250 Mbps in total for "C1", "C2" and "C3") for containers running inside the same virtual machine (e.g., "VM1") cannot exceed the corresponding virtual machine reservation value (e.g., 1000 Mbps for "VM1").

As explained using FIG. 1, QoS policies 311-316 in FIG. 3 may be configured by a user (e.g., network administrator) operating user device 170 by interacting with management entity 160 via physical network 150. For example, QoS policies 311-316 may be configured using an interface (e.g., graphical user interface, command-line interface, etc.) and/or Application Programming Interface (API) calls supported by management entity 160, such as using API module 162 and network management module 164.

Another approach is to configure QoS policies 311-316 as corresponding containers "C1" to "C6" are started. Using example "C1" as an example, command line "Docker run--name=CON1-network-shares=50-network-limit=500-network-reservation=120-cpu-shares=20-memory=256 ubuntu/bin/sh" may be used to run and allocate a new container with name="CON1", shares=50, limit=500 Mbps, reservation=120 Mbps, CPU shares=20 and memory=256 MB. In this case, the shares, limit and reservation values provided may be used to configure QoS policy 311, which will be added to table 300 when "C1" is started. In practice, guest tools running on corresponding "VM1" may provide the values to management entity 160 via hypervisor 111. In another example, QoS policies 311-316 in FIG. 3 may be configured programmatically, such as using a script, etc. QoS policies 311-316 may be stored in any suitable storage device accessible by management entity 160 (e.g., Container QoS policies 166) and/or host 110 to facilitate traffic forwarding when containers are running.

In practice, "VM1" and "VM2" may share an even larger network resource pool reserved for virtual machine traffic (which includes container traffic). For example, there may be other types of traffic in virtualized computing environment 100, such as traffic relating to network file system (NFS), virtual machine migration, fault tolerance (FT), Internet small computer system interface (iSCSI), management functionality, etc. Similar shares, limit and reservation values may be defined for other traffic types.

Starting Containers

In the example in FIG. 1, containers "C1" to "C6" may be running (i.e., started) or exited (i.e., stopped) in virtualized computing environment 100. For example, when "C1" is running, it is run as an isolated process or namespace independent of other processes on "VM1" and host 110. When "C1" is exited, data relating to its operation (e.g., file system, exit value, etc.) is preserved. Depending on the desired implementation in practice, "C1" to "C6" may be started (to run), stopped or restarted (to run again).

According to examples of the present disclosure, an admission control process may be performed to govern whether containers can be started. For example, before "C1" is allowed to start running, the current available network bandwidth is assessed to ensure that QoS policy 311 configured for "C1" can be satisfied. The current available bandwidth may depend on a number of factors, such as the bandwidth of physical NIC 114, network congestion, packet size, packet loss, etc. Two example implementations will be described below using FIG. 5 (i.e., admission control by hypervisor 111) and FIG. 6 (i.e., admission control by management entity 160).

Figure 5:
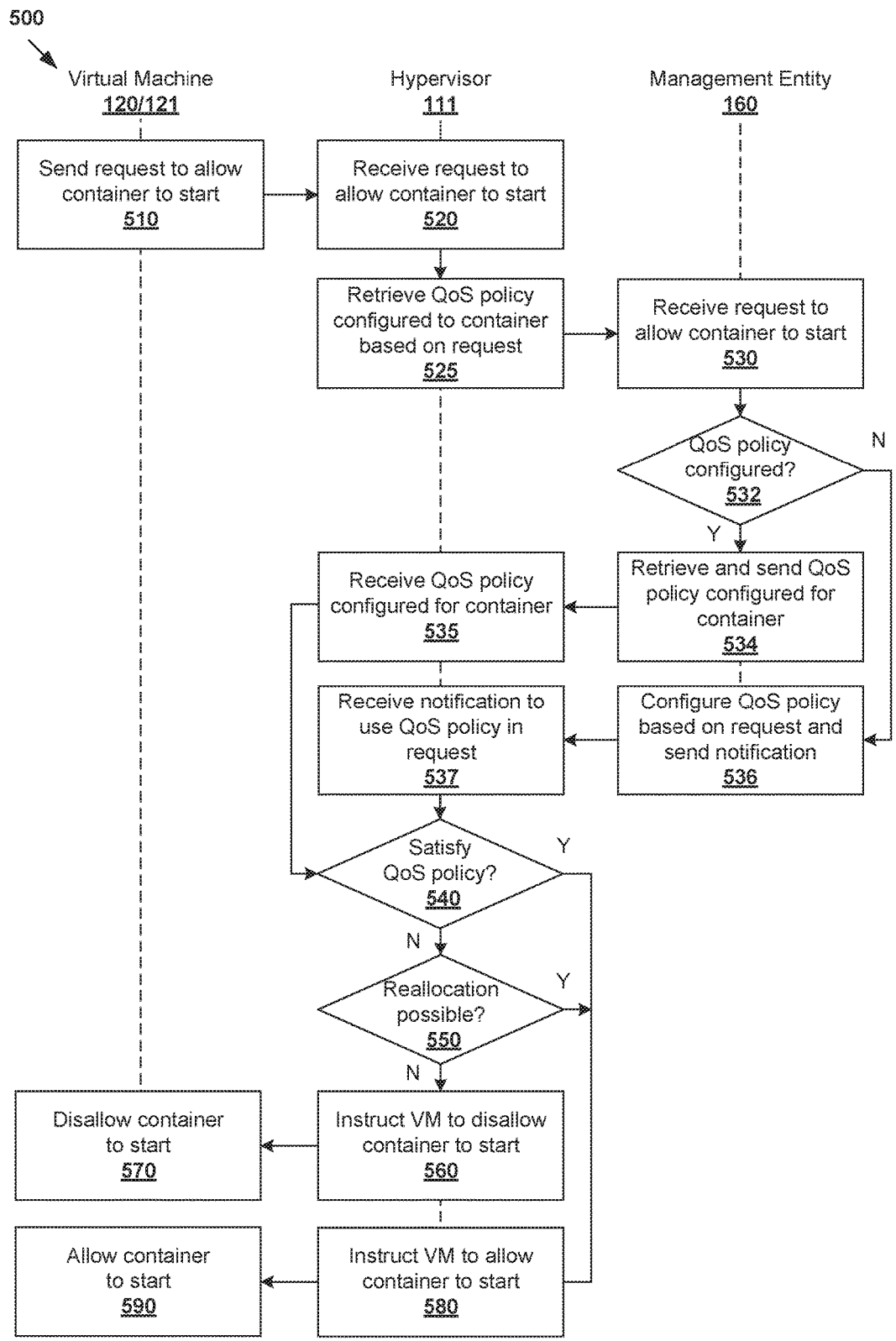
FIG. 5 is a flow chart of an example process for starting a container in the example virtualized computing environment in FIG. 1 according to a first example implementation.

FIG. 5 is a flow chart of example process 500 for starting a container in virtualized computing environment 100 in FIG. 1 according to a first example implementation. Example process 500 is illustrated using one or more operations, functions, or actions represented by 510 to 590. The various operations, functions, or actions may be combined, divided, and/or eliminated based upon the desired implementation. Example process 500 may be implemented by virtual machine 120, 121 (e.g., using guest agent or "VM tools" on guest OS 122, 123), hypervisor 111 (e.g., using network module 132 at virtual switch 130) and management entity 160 (e.g., using network management module 164 having access to container QoS policies 166). For simplicity, "C1" and "VM1" will be used as example container and virtual machine in the following.

At 510 in FIG. 5, upon detecting that "C1" is starting, "VM1" sends a request via vNIC 126 to hypervisor 111 to allow container to start running. For example, the request may include a container name (e.g., "CON1"), container ID, tag data (e.g., "TAG1") or any other suitable data for identifying "C1". The request may further include the amount of network bandwidth (e.g., shares=50, limit=500 Mbps, reservation=120 Mbps) requested by "C1" to start running.

At 520 and 525 in FIG. 5, hypervisor 111 receives the request from "VM1" and retrieves QoS policy 311 configured for "C1". In one example, the retrieval may include sending the request to management entity 160. At 530 and 532 in FIG. 5, management entity 160 receives the request from hypervisor 111, and determines whether there is any QoS policy configured for "C1" in table 300/166. If yes, at 534 in FIG. 5, management entity 160 retrieves and sends QoS policy 311 configured for "C1" to hypervisor 111 via physical network 150. At 535, hypervisor 111 receives QoS policy 311 from management entity 160.

Otherwise, at 536 in FIG. 5, management entity 160 creates a new entry in table 300/166 to add QoS policy 311 based on the received request. At 537 in FIG. 5, hypervisor 111 is also notified to rely on the container shares, limit and reservation values for "C1" that are specified in the request. In other words, if there is an existing QoS policy for "C1", the existing policy retrieved from management entity 160 will be used. Otherwise (e.g., when "C1" is started for a first time), if there is no existing QoS policy for "C1", the QoS policy is obtained from the request. This facilitates automatic configuration of QoS policies 311-316 as containers are started.

At 540 in FIG. 5, hypervisor 111 determines whether QoS policy 311 can be satisfied with current available network bandwidth in the network resource pool of "VM1". As explained using FIG. 3, QoS policy 311 specifies shares=50, limit=500 Mbps and reservation=120 Mbps for "C1", which depend on shares=100, limit=2000 Mbps and reservation=1000 Mbps for "VM1". Hypervisor 111 may calculate the network bandwidth available for "VM1" and determine whether QoS policy 311 can be satisfied. For example, if "VM1" has only used up 50% of its reservation=1000 Mbps, the remaining network bandwidth of 500 Mbps may be used to guarantee reservation=120 Mbps for "C1".

At 550 in FIG. 5, in response to determination that QoS policy 311 cannot be satisfied at 540, hypervisor 111 determines whether a network bandwidth reallocation is possible to satisfy QoS policy 311. For example, if there is unused network bandwidth from the network resource pool of "VM2" or "VM3", a portion of the unused network bandwidth may be (e.g., temporarily) reallocated to "VM1" and therefore "C1". Additionally or alternatively, a virtual machine may be migrated to another host or a container stopped to release some network bandwidth to support "C1".

For example, another virtual machine (e.g., "VM2") may be migrated or "VM1" itself may be migrated to another host with sufficient network bandwidth to support "C1".

At 560 and 570 in FIG. 5, in response to determination that QoS policy 311 cannot be satisfied, hypervisor 111 instructs "VM1" to disallow "C1" to start running. Otherwise, at 580 and 590 in FIG. 5 (i.e., QoS policy 311 can be satisfied), hypervisor 111 instructs "VM1" to allow "C1" to start running. Once "C1" starts running, the shares value, limit value and reservation value defined by QoS policy 311 will be enforced for any traffic flow to and from "C1".

Although example process 500 shows hypervisor 111 allowing or disallowing "C1" to start running, an alternative implementation may involve management entity 160 making admission control decisions. In more detail, FIG. 6 is a flow chart of example process 600 for starting a container in example virtualized computing environment 100 in FIG. 1 according to a second example implementation. Example process 600 is illustrated using one or more operations, functions, or actions represented by 610 to 675. The various operations, functions, or actions may be combined, divided, and/or eliminated based upon the desired implementation.

Similar to FIG. 5, example process 600 may be implemented by virtual machine 120, 121 (e.g., using guest agent or "VM tools" on guest OS 122, 123), hypervisor 111 (e.g., using network module 132 at virtual switch 130) and management entity 160 (e.g., using network management module 164 having access to container QoS policies 166). Again, for simplicity, "C1" and "VM1" will be used as example container and virtual machine in the following.

Figure 6:
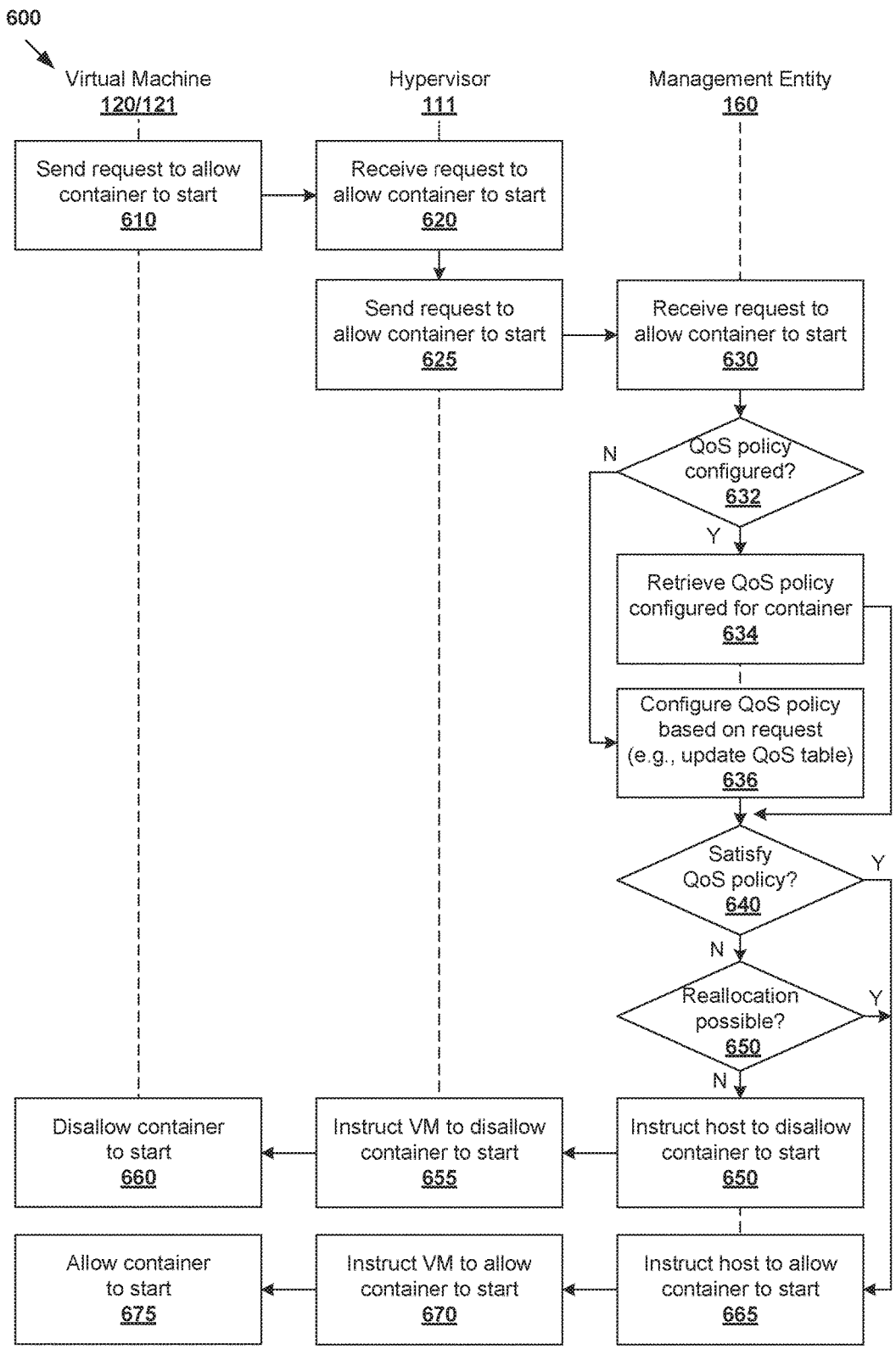
FIG. 6 is a flow chart of an example process for starting a container in the example virtualized computing environment in FIG. 1 according to a second example implementation.

At 610 in FIG. 6 (related to 510 in FIG. 5), upon detecting that container "C1" is starting, "VM1" sends a request via vNIC 126 to hypervisor 111 to allow "C1" to start running. The request may include a container ID, tag data (e.g., "TAG1") or any other suitable data for identifying "C1". The request may further include shares=50, limit=500 Mbps, reservation=120 Mbps requested by "C1" to start running. At 620 and 625 in FIG. 6 (related to 520 in FIG. 5), hypervisor 111 receives the request and sends it to management entity 160.

At 630 (related to 530 in FIG. 5), upon receiving the request from hypervisor 111, management entity 160 determines whether a QoS policy has been previously configured for "C1". If yes, at 634 in FIG. 6, management entity 160 retrieves QoS policy 311 configured for "C1" from table 300/166, such as based on the container ID and container name in the request. Otherwise, at 636 in FIG. 6, management entity 160 creates a new entry in table 300/166 to add QoS policy 311 that includes the container shares, limit and reservation values requested by "C1".

At 640 in FIG. 6 (related to 540 in FIG. 5), management entity 160 determines whether QoS policy 311 can be satisfied. The determination may be based on whether the current available network bandwidth in the network resource pool of "VM1" can be used to support shares=50, limit=500 Mbps and reservation=120 Mbps defined in QoS policy 311 configured for "C1".

At 645 in FIG. 6 (related to 550 in FIG. 5), in response to determination that QoS policy 311 cannot be satisfied, hypervisor 111 determines whether a network bandwidth reallocation is possible to satisfy QoS policy 311. Similar to 550 in FIG. 5, the reallocation may involve "borrowing" spare network bandwidth from another resource pool, or releasing network bandwidth by migrating virtual machine (s), stopping container(s), etc. For example, another virtual machine (e.g., "VM2") may be migrated or "VM1" itself may be migrated to another host with sufficient network bandwidth to support "C1".

At 650, 655 and 660 in FIG. 6 (related to 560 and 570 in FIG. 5), in response to determination that QoS policy 311 cannot be satisfied, management entity 160 instructs hypervisor 111 to disallow "C1" to start running, in which case hypervisor 111 also instructs "VM1" the same. Otherwise, at 665, 670 and 675 in FIG. 6 (related to 580 and 590 in FIG. 5), management entity 160 instructs hypervisor 111 to allow "C1" to start running, in which case hypervisor 111 also instructs "VM1" the same.

Traffic Forwarding for Containers

Figure 7:
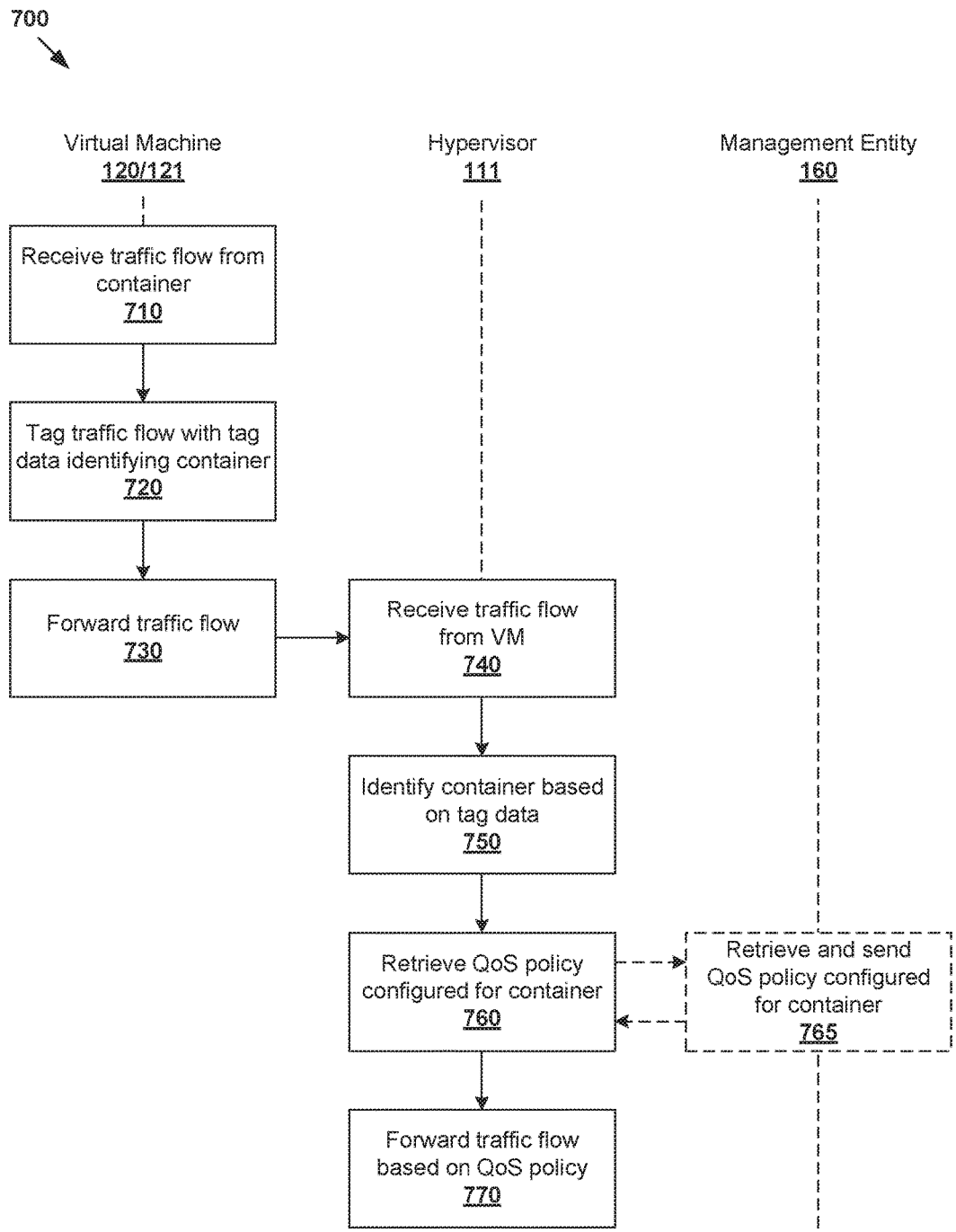
FIG. 7 is a flow chart of an example process for forwarding a traffic flow originating from a container according to a QoS policy in the example virtualized computing environment in FIG. 1.

FIG. 7 is a flow chart of example process 700 for forwarding a traffic flow of a container according to a QoS policy in example virtualized computing environment 100 in FIG. 1. Example process 700 is illustrated using one or more operations, functions, or actions represented by 710 to 770. The various operations, functions, or actions may be combined, divided, and/or eliminated based upon the desired implementation.

Similar to the examples in FIG. 5 and FIG. 6, example process 700 may be implemented by virtual machine 120, 121 (e.g., using guest agent or "VM tools" on guest OS 122, 123), hypervisor 111 (e.g., using network module 132 at virtual switch 130) and management entity 160 (e.g., using network management module 164 having access to container QoS policies 166). Again, for simplicity, "C1" and "VM1" will be used as example container and virtual machine in the following.

At 710 and 720 in FIG. 7, upon detecting a traffic flow of packets from "C1", "VM1" tags the traffic flow with any suitable data identifying "C1". The traffic flow from "C1" represents an egress traffic flow (may also be referred to as "outgoing packets") from "C1" to a destination accessible via physical network 150. In practice, the traffic flow may be detected and tagged by "VM1" using a guest agent that hooks onto the network stack of guest OS 122. As described using FIG. 3, "VM1" is aware of, or has access to, the mapping between container ID (see 318 in FIG. 3), container IP address (see 320 in FIG. 3) and tag data (see 328 in FIG. 3).

In response to detecting packets having a source IP address that matches with the IP address=172.17.42.1 associated with "C1", "VM1" generates a tagged traffic flow by modifying the packets to include tag data "TAG1". At 730 in FIG. 7, "VM1" forwards the tagged traffic flow via vNIC 126 to hypervisor 111 for forwarding to physical network 150 via virtual switch 130 and physical NIC 114. See also traffic flow 180 and tagged traffic flow 182 in FIG. 1.

Figure 8:
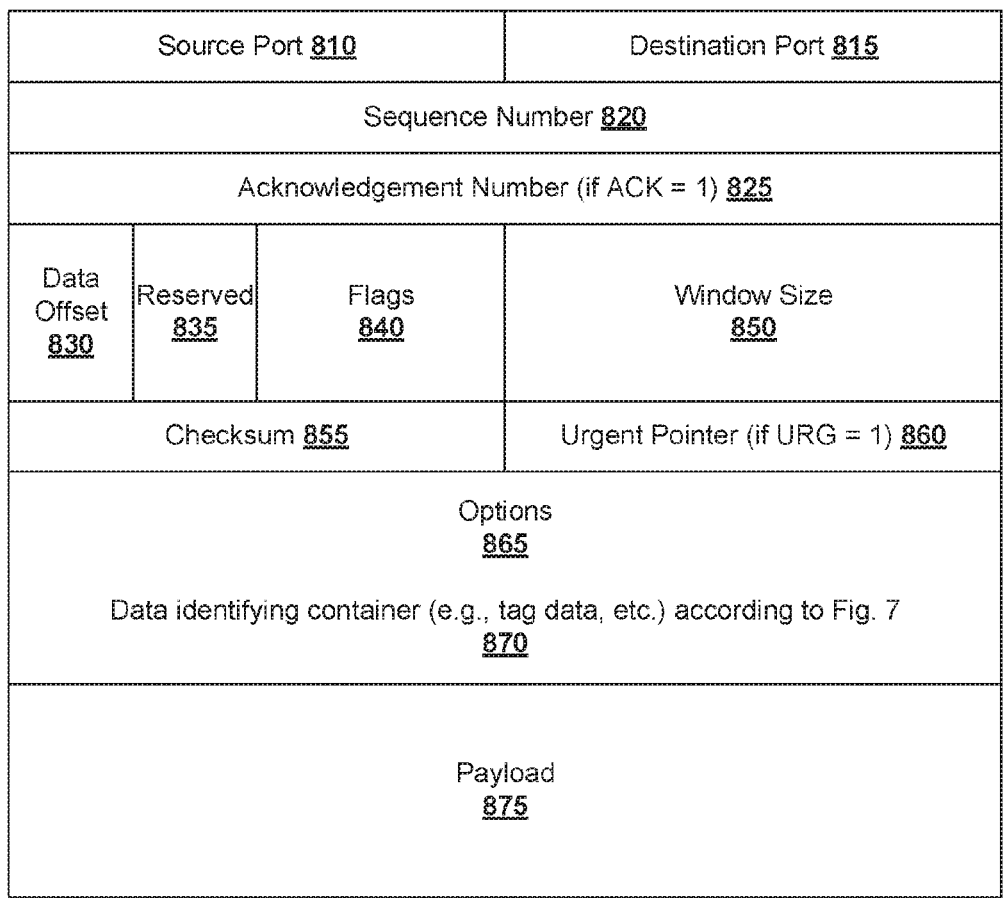
FIG. 8 illustrates an example packet tagged with data identifying a container for forwarding according to the example process in FIG. 7.

In one example, the tagging process at 720 may involve modifying header data in each packet to include "TAG1" associated with "C1". FIG. 8 illustrates example packet 800 tagged with data identifying a container for forwarding according to example process 700 in FIG. 7. In this example, example packet 800 is a Transport Control Protocol/Internet Protocol (TCP/IP) packet, but any other suitable protocol may be used. In practice, example packet 800 may include alternative or additional fields based upon the desired implementation.

Example packet 800 includes suitable header data, such as source port 810, destination port 815, sequence number 820, acknowledgement number 825, data offset 830, reserved field 835, various flags 840, window size 850, checksum 855, urgent pointer 860, and options 865. Payload information 870 follows the header information. According to 720 in FIG. 7, options field 865 may be modified to include tag data 870 (e.g., "TAG1") such that hypervisor 111 is able to identify "C1".

It may be possible for hypervisor 111 to identify "C1" based on the source IP address of the traffic flow. However, it is not always reliable to rely on the source IP address to identify "C1", especially if the IP address is volatile and susceptible to frequent changes. In this case, it may be inefficient to update table of QoS policies 348 every time the IP address changes and as such, the tagging process 720 at FIG. 7 may be implemented.

At 740, 750 and 760 in FIG. 7, in response to receiving the traffic flow from "VM1", hypervisor 111 identifies "C1" from which the traffic flow originates and retrieves QoS policy 311 configured for "C1". For example, hypervisor 111 may parse the header data of the received traffic flow to examine tag data 870 in options field 865 (see FIG. 8). Hypervisor 111 identifies "C1" as the source container if tag data 870 matches with "TAG1".

The retrieval at 760 in FIG. 7 may include hypervisor 111 retrieving QoS policy 311 from local storage, or from management entity 765 (shown in dotted box) if QoS policy 311 is not available at host 110. In the latter case at 765, network management module 164 at management entity 160 may retrieve QoS policy 311 based on tag data "TAG1" or container ID associated with "C1" and send retrieved QoS policy 311 to hypervisor 111 via physical network 150.

At 770 in FIG. 7, hypervisor 111 forwards the traffic flow of packets from "C1" according to QoS policy 311 configured for "C1". In practice, network module 132 at virtual switch 130 may implement a packet scheduler to schedule the packets for forwarding at a data transfer rate that is at least reservation=120 Mbps but at most limit =500 Mbps. Packet scheduler may also allocate available network bandwidth according to shares=50 while satisfying reservation=120 Mbps and limit=500 Mbps. For example, a dedicated software queue may be maintained for the traffic flow from each container for this purpose.

Figure 4:
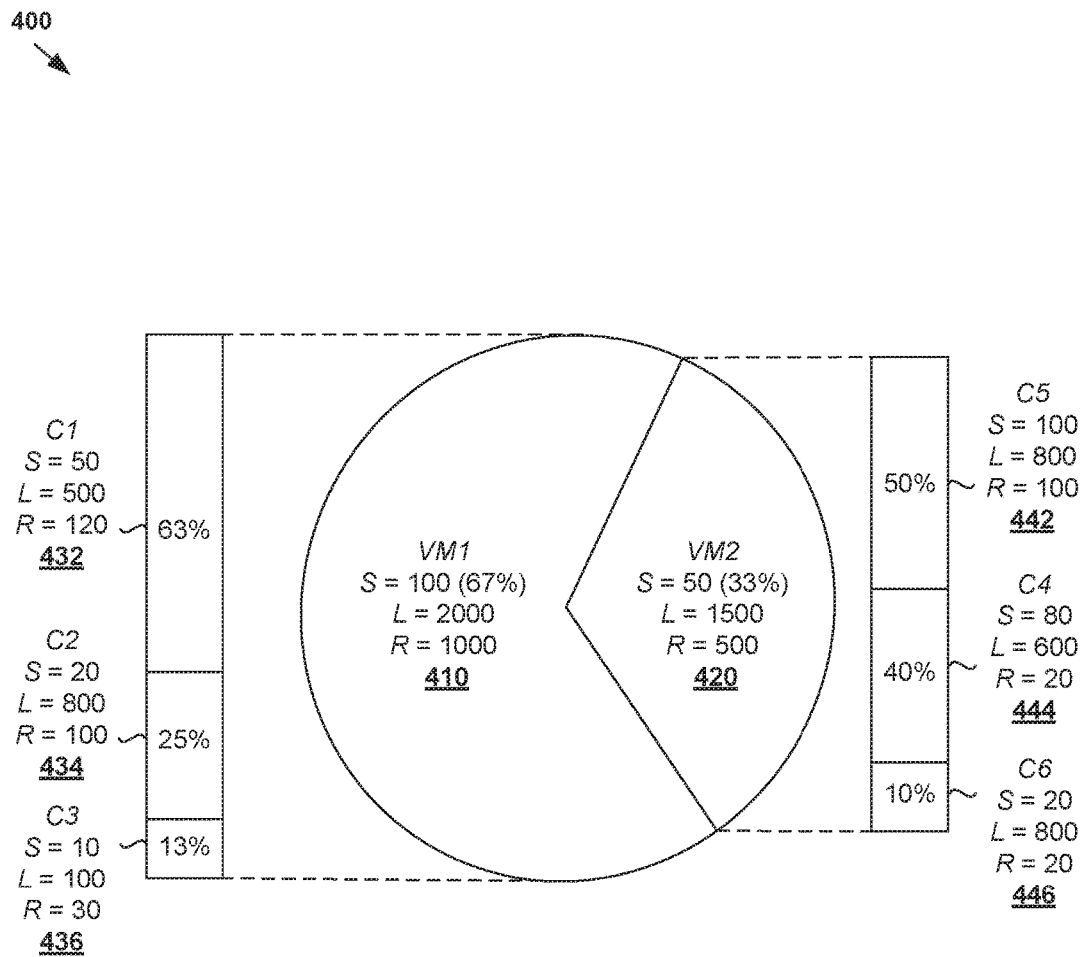
FIG. 4 is a schematic diagram illustrating subdivisions of network resource pools according to the example QoS policies in FIG. 3.

Using the examples in FIG. 3 and FIG. 4, if there is unused network bandwidth =1000 Mbps in the network resource pool of "VM1", "C1", "C2" and "C3" will be guaranteed at least 120 Mbps, 100 Mbps and 30 Mbps respectively. The remaining unused network bandwidth of 750 Mbps (i.e., 1000–sum of container reservation values) may be allocated according to respective shares values (i.e., 50/80 or 63% for "C1", 20/80 or 25% for "C2" and 10/80 or 13% for "C3") without exceeding respective limit values (i.e., 500 Mbps for "C1", 800 Mbps for "C2" and 100 Mbps for "C3").

When "C1" is stopped, "VM1" may inform hypervisor 111, which may in turn inform management entity 160 to remove QoS policy 311 configured for "C1". In this case, table 300 may be updated by management entity 160 as containers are started and stopped in virtualized computing environment 100.

Distributed Virtual Switch (DVS)

Although the examples in FIG. 2 to FIG. 8 are explained with reference to hypervisor 111 implementing virtual switch 130 in FIG. 1, it will be appreciated that a distributed virtual switch (DVS) may also be used. The DVS represents a collection of different virtual switches 130 across different hosts 110. In practice, the DVS may be implemented using any suitable technology, such as vSphere Distributed Switch (developed by VMware, Inc.), etc.

Figure 9:
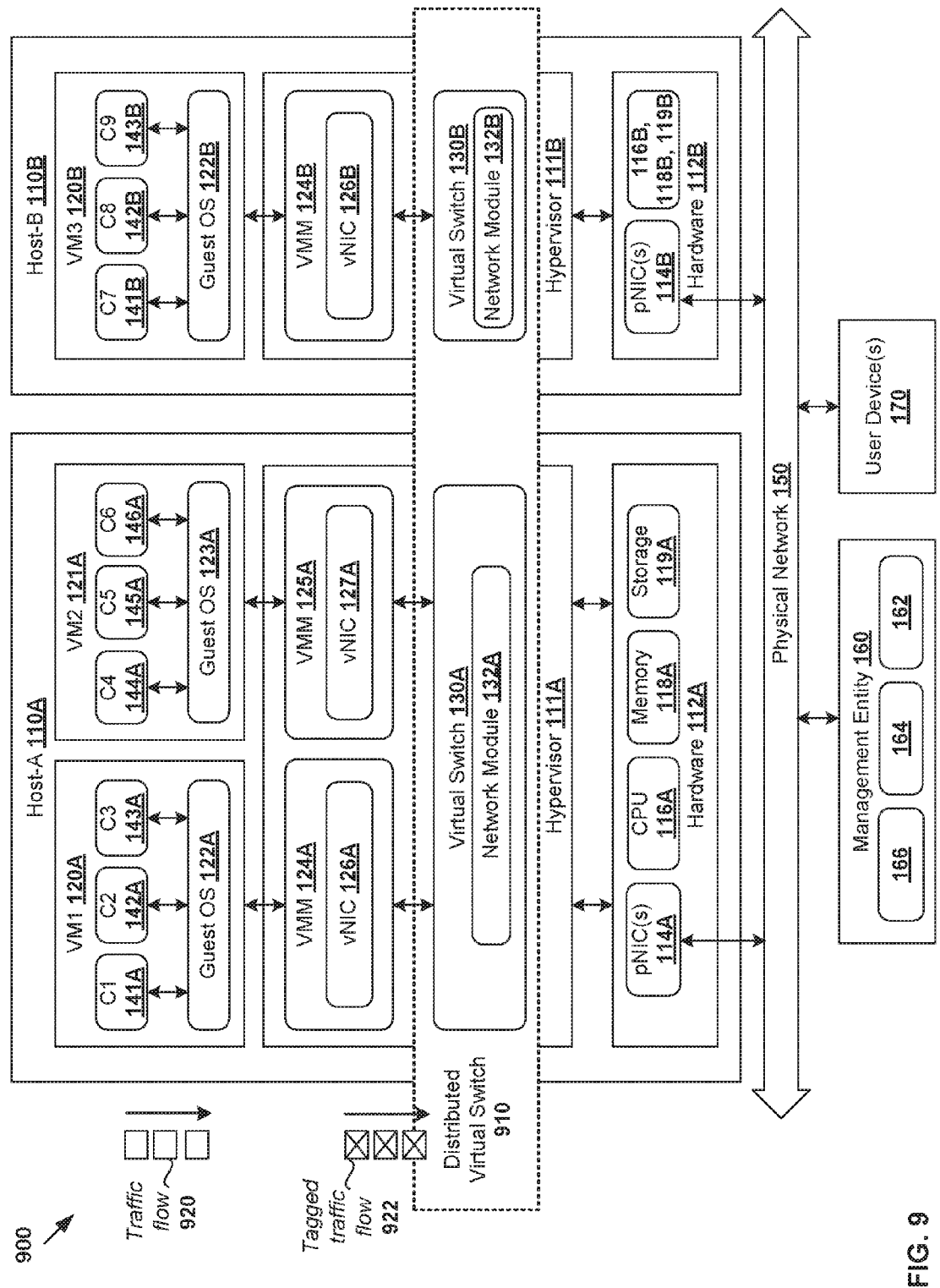
FIG. 9 is a schematic diagram of an example virtualized computing environment with a distributed virtual switch.

In more detail, FIG. 9 is a schematic diagram of example virtualized computing environment 900 with DVS 910. Although an example is shown, it should be understood that environment 900 and DVS 910 may include additional or alternative components, and each component may have a different configuration, depending on the desired implementation. DVS 910 (see dotted line box) spans across multiple hosts, such as Host-A 110A and Host-B 110B. In the following, reference numerals with a suffix "A" refer to elements relating to Host-A 110A and suffix "B" to Host-B 110B.

Similar to the example in FIG. 1, Host-A 110A executes hypervisor 111A and includes hardware 112A to support virtual machines "VM1" 120A and "VM2" 121A. Hypervisor 111A implements VMM 124A to emulate vNIC 126A associated with "VM1" 120A, as well as VMM 125A to emulate vNIC 127A associated with "VM2" 121A. To support "VM3" 120B, Host-B 110B includes hardware 112B and executes hypervisor 111B to implement VMM 124B that emulates vNIC 126B. Using container technologies, containers "C1" 141A, "C2" 142A and "C3" 143A may run on guest OS 122A inside "VM1" 120A; "C4" 144A, "C5" 145A and "C6" 146A on guest OS 123A inside "VM2" 121A; and "C7" 141B, "C8" 142B and "C9" 143B on guest OS 122B inside "VM3" 120B.

DVS 910 binds virtual switch 130A of Host-A 110A and virtual switch 130B of Host-B 110B into an aggregate virtual switch. Compared to having to manage individual and segregated virtual switches 130A, 130B, DVS 910 is logically configurable to simplify the provisioning and administration of virtual networks connecting virtual machines 120A, 121A, 120B across multiple hosts 110A, 110B. DVS 910, being a software abstraction, may be implemented using any suitable number of components distributed in different hardware. In the example in FIG. 9, components of DVS 910 may be implemented using hypervisor 111A on Host-A 110A and hypervisor 111B on Host-B 110B.

Similar to the examples in FIG. 1, FIG. 2 and FIG. 7, "VM1" 120A may tag traffic flow of packets (see 920) originating from "C1" 141A may be with tag data identifying "C1". The resulting in tagged traffic flow (see 922) is then forwarded to DVS 910 via vNIC 126A. Upon receiving tagged traffic flow 922 from "VM1", DVS 910 may identify "C1" based on the tag data, and retrieve QoS policy 311 configured for "C1". For example, QoS policy 311 may be retrieved from a local storage, or from management entity 160 (e.g., via network management module 164 with access to QoS policies 166).

Such container traffic flow differentiation allows DVS 910 to forward tagged traffic flow 922 according to QoS policy 311 via physical NIC 114A. Similar to the examples in FIG. 3 and FIG. 4, QoS policy 311 specifies a network bandwidth allocation for "C1", for example based on a network resource pool of "VM1". QoS policy 311 may specify according to least one of: container shares value, container limit value and container reservation value.

Prior to the above traffic forwarding, an admission control process may be performed. In this case, DVS 910 may interact with management entity 160 to determine whether to allow "C1" to start running based on QoS policy 311. Similar to the examples in FIG. 5 and FIG. 6, the determination may be made by DVS 910 or management entity 160. In practice, management entity 160 may implement a Network Input Output Control (NIOC) module and network virtualization manager (NSX manager) to facilitate the examples explained using FIG. 2 to FIG. 8.

Although one DVS 910 is shown for simplicity, multiple DVSs may be configured to form multiple virtual networks logically connecting different virtual machines on different hosts. As used herein, the term "virtual network" refers generally to a logical overlay network, and not simply a software implementation of a physical network, which is sometimes the intended meaning of the same term by those in the art. The logical overlay network is a conceptual network that can be arbitrarily defined and distributed in an arbitrary manner over physical resources.

In one example, a "device" (e.g., container, virtual machine, etc.) may reside on a layer-2 logical network that is overlayed on a layer-3 physical network. In such a scenario, a tunnelling protocol (e.g., Virtual eXtensible Local Area Network (VXLAN), Generic Network Virtualization Encapsulation (GENEVE), Network Virtualization using Generic Routing Encapsulation (NVGRE), etc.) may encapsulate Ethernet layer-2 frames in IP (e.g., Media Access Control (MAC) in User Datagram Protocol (UDP) or "MAC-in-UDP" encapsulation) and allow the "device" to participate in a virtualized layer-2 subnet that operates in separate physical layer-3 networks. The term "layer-2" generally refers to a Media Access Control (MAC) layer and "layer-3" to a network layer in the Open System Interconnection (OSI) model.

Although not shown in FIG. 9 for simplicity, DVS 910 may include a logical collection of distributed virtual ports (DV ports) that connect (e.g., logically associated) with respective vNICs 126A, 127A, 126B. A DV port may be understood as a software abstraction that encapsulates the "personality" (including configuration and runtime state, etc.) of a corresponding virtual port of virtual switch 130A, 130B. Unlike a virtual port, a DV port usually persists and migrates with its associated virtual machine. Multiple DV ports may form a DV port group.

Container-Aware Traffic Handling

As explained above, examples of the present disclosure facilitate policy configuration for, and differentiation of traffic flows originating from, different containers 141-146. Throughout the present disclosure, the term "policy" or "policies" may refer generally to a set of action(s) that may be performed when a traffic flow of packets originating from or destined for a particular container is detected. Any suitable policy or policies may be configured for containers 141-146, such as QoS policies explained above, firewall policies, load balancing policies, etc.

Figure 10:
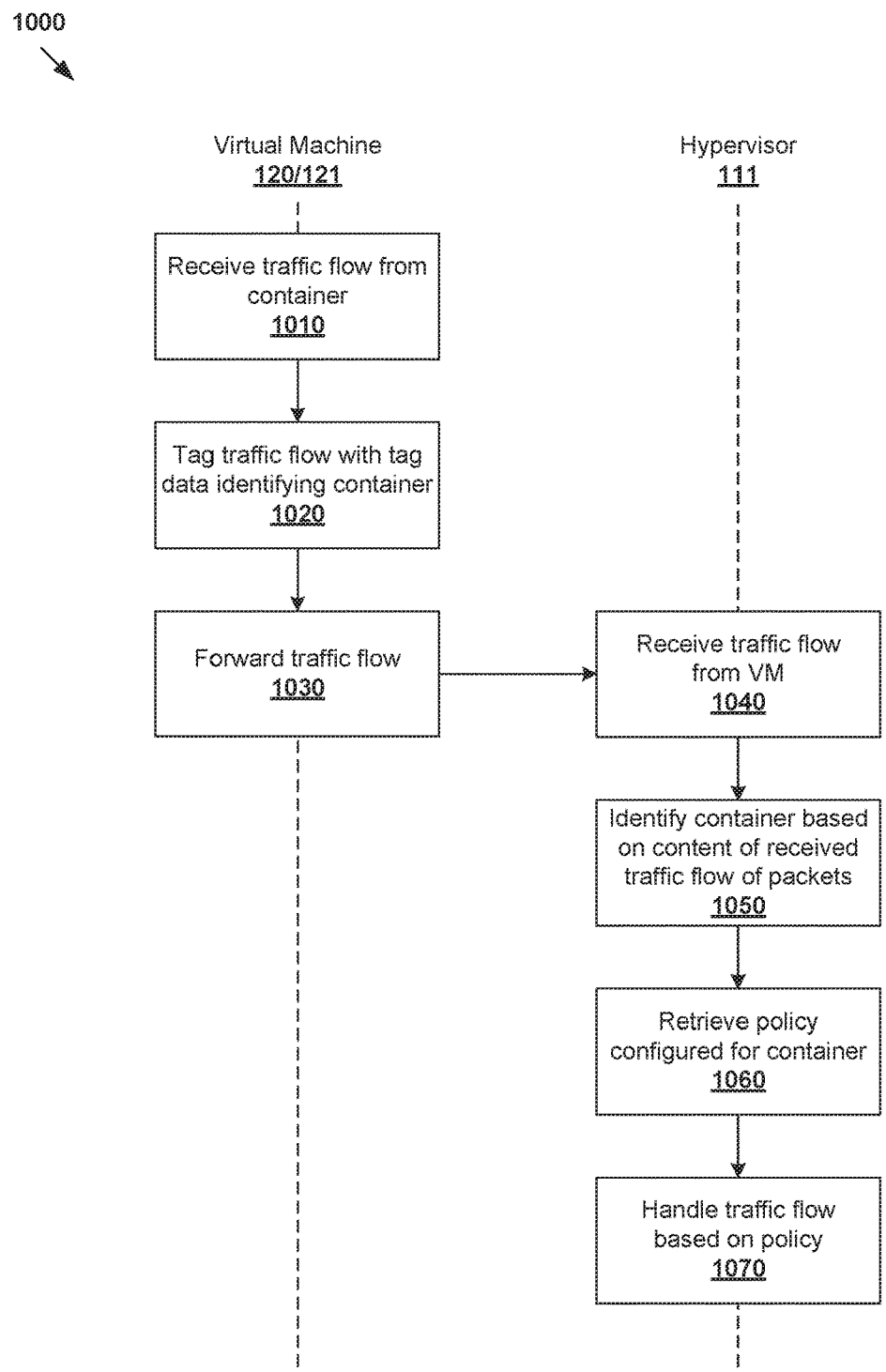
FIG. 10 is a flow chart of an example process for a computing device to perform traffic handling for a container in the example virtualized computing environment in FIG. 1.

FIG. 10 is a flow chart of example process 1000 for a computing device to perform traffic handling for a container according to a policy in example virtualized computing environment 100 in FIG. 1. Example process 1000 is illustrated using one or more operations, functions, or actions represented by 1010 to 1070. The various operations, functions, or actions may be combined, divided, and/or eliminated based upon the desired implementation. Example process 1000 may be implemented by virtual machine 120, 121 (e.g., using guest agent or "VM tools" on guest OS 122, 123) and hypervisor 111. For simplicity, various examples will be explained using container "C1" 141 and virtual machine "VM1" 120 in the following.

At 1010 and 1020 in FIG. 10, upon detecting a traffic flow of packets from "C1", "VM1" tags the traffic flow with any suitable data identifying "C1." The traffic flow from "C1" represents an egress traffic flow (may also be referred to as "outgoing packets" or "outgoing traffic flow") from "C1" to a destination accessible via physical network 150. In practice, the traffic flow may be detected and tagged by "VM1" using a guest agent that hooks onto the network stack of guest OS 122. Further, "VM1" is aware of, or has access to, the mapping between a container ID (e.g., "C1"), container IP address (e.g., 172.17.42.1) and tag data (e.g., "TAG1").

In response to detecting packets having a source IP address that matches with the IP address=172.17.42.1 associated with "C1", "VM1" generates a tagged traffic flow by modifying the packets to include tag data "TAG1". At 1030 in FIG. 10, "VM1" forwards the tagged traffic flow via vNIC 126 to hypervisor 111 for forwarding to physical network 150 via virtual switch 130 and physical NIC 114. See also traffic flow 180 and tagged traffic flow 182 in FIG. 1. In one example, the tagging process at 1020 may involve modifying header data in each packet to include "TAG1" associated with "C1," an example of which is shown in FIG. 8.

At 1040 and 1050 in FIG. 10, in response to receiving the traffic flow from "VM1", hypervisor 111 identifies "C1" from which the traffic flow originates based on content of the traffic flow. For example, hypervisor 111 may parse the header data of the received traffic flow to examine tag data (e.g., see 870 in FIG. 8) in each packet. Hypervisor 111 may then identify "C1" as the source container if the tag data matches with "TAG1".

At 1060 and 1070 in FIG. 10, hypervisor 111 retrieves a policy configured for the identified "C1" and handles the traffic flow of packets according to the policy. The policy may be retrieved at block 1060 from any suitable source, such as storage (e.g., local storage 119 in FIG. 1) accessible by hypervisor 111, management entity 160, etc.

Figure 11:
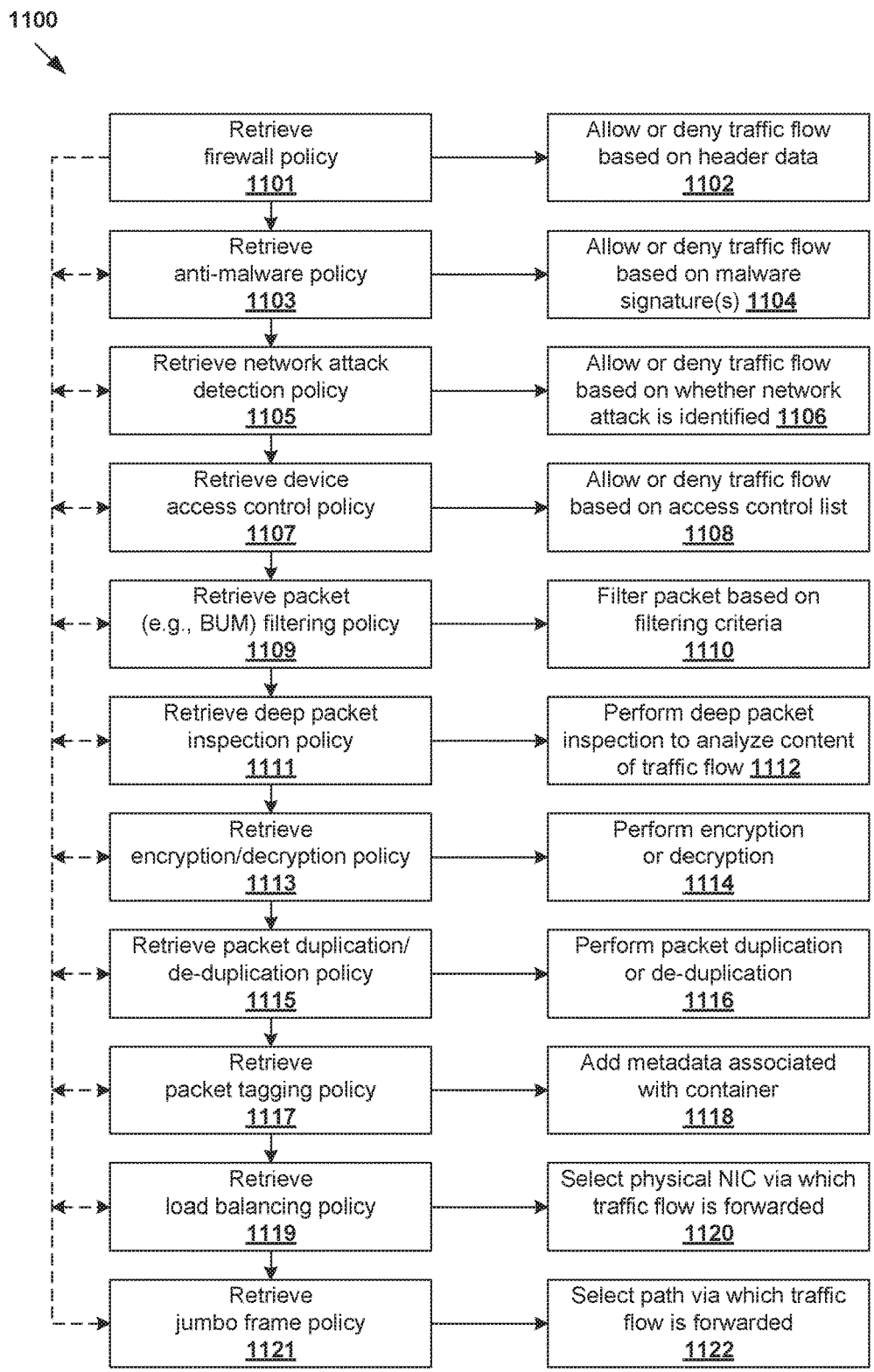
FIG. 11 is a flow chart of an example process for a computing device to perform traffic handling for a container according to various example policies.

Some examples will be discussed below using FIG. 11, which is a flow chart of example process 1100 for a computing device to perform traffic handling for a container according to various example policies. Example process 1100 is illustrated using one or more operations, functions, or actions represented by 1101 to 1122. The various operations, functions, or actions may be combined, divided, and/or eliminated based upon the desired implementation. It should be understood that one or more policies illustrated in FIG. 11 may be implemented for a particular container in practice, and different numbers or types of policies may be configured for different containers.

As will be explained further below, the term "handle" or "handling" at block 1070 in FIG. 10 may refer generally to performing one or more actions specified by a policy configured for the container. For example, the policy may specify an action to allow or deny the traffic flow of packets (see 1101-1108), analyzing content of the traffic flow of packets (see 1109-1112), modifying the traffic flow of packets (see modification in the forms of encryption, decryption, duplication, de-duplication and tagging at 1113-1118), determining a forwarding decision by selecting a physical NIC or path for the traffic flow of packets (see 1119-1122), generating and sending a report based on the traffic flow of packets (e.g., when the traffic flow is denied at 1101-1108), etc. Depending on the desired implementation, any alternative and/or additional action(s) may be performed.

(1) Firewall Policies (See 1101-1102)

FIG. 12 illustrates example table 1200 of firewall policies configured for containers 141-146 in example virtualized computing environment 100 in FIG. 1. In this example, firewall policies 1211-1218 may be configured to protect containers 141-146 and other entities (e.g., hosts, virtual machines and containers) in virtualized computing environment 100 against security threats. In practice, firewall policies may be applied or invoked by a distributed firewall engine (not shown) implemented by hypervisor 111 to filter packets destined for and/or originating from containers 141-146. A traffic flow of packets may be filtered according to firewall policies at any point along a datapath between containers 141-146 to physical NIC 114. In one embodiment, a filter component (not shown) is incorporated into each vNIC 126/127 that enforces firewall rules that are associated with a particular container corresponding to that vNIC 126/127.

In the example in FIG. 12, each firewall policy specifies a container ID and tag data identifying a container. Each firewall policy further specifies a set of tuples that includes a source port number (PN), destination address information, a destination PN, protocol, and an action (e.g., allow or deny). An acceptable value, or range of values, may be specified for each tuple. The protocol tuple (also known as service) may be set to TCP, user datagram protocol (UDP), hypertext transfer protocol (HTTP), HTTP Secure (HTTPS), etc. In practice, each firewall policy may also specify source address information (not shown), such as source IP address=172.17.42.1 associated with "C1." However, as explained using FIG. 7, it is not always reliable to rely on the source IP address to identify "C1", especially if the IP address is volatile and susceptible to frequent changes.

Once a firewall policy configured for "C1" is retrieved, hypervisor 111 may handle (i.e., allow or deny) the traffic flow of packets originating from "C1" according to the firewall policy. This may involve hypervisor 111 parsing the header data of each packet to identify a set of tuples. A (matching) firewall policy configured for "C1" is then retrieved based on the set of tuples and tag data. For example, based on tag data "TAG1" and a first set of tuples (destination IP address="IP-DEST1," destination port number=443 and service=HTTPS), hypervisor 111 retrieves and applies first firewall policy 1211 to allow the packets to be forwarded to their destination. In another example, based on tag data "TAG1" and a second set of tuples (destination IP address ="IP-DEST2," destination port number="any" and service=TCP), hypervisor 111 retrieves and applies second firewall policy 1212 to deny the traffic flow (i.e., not forwarded or dropped).

Similarly, hypervisor 111 may apply firewall policies 1213-1218 configured for other containers 142-146. For example, in response to receiving another outgoing traffic flow from "VM1" and identifying source container="C2" based on tag data="TAG2" in each packet, hypervisor 111 may allow the packets to be forwarded based on third security policy 1213 specifying (destination IP="IP-DEST3," destination port number="any" and service=HTTPS), or deny them based on fourth security policy 1214 specifying (destination IP="IP-DEST4," destination port number="any" and service=UDP).

(2) Anti-Malware Policies (see 1103-1104)

According to an anti-malware policy configured for "C1," hypervisor 111 may allow or deny a traffic flow of packets originating from "C1" based on one or more malware signatures. This may involve analyzing the content (e.g., header data and/or payload data) of each packet and performing a comparison with the malware signature(s). Based on the comparison, the traffic flow of packets may be denied (i.e., if there is a match with a malware signature) or allowed (i.e., no match found). A report may be generated and sent to management entity 160 and/or user device 170 when the traffic flow is denied. As used herein, the term malicious software or "malware" refers to an umbrella term that covers various forms of hostile software, such as viruses, worms, Trojan horse programs, spyware, phishing, adware, riskware, rookits, spams, scareware, ransomware, a combination thereof, etc.

(3) Network Attack Detection Policies (See 1105-1106)

According to a network attack detection policy configured for "C1," hypervisor 111 may allow or deny a traffic flow of packets originating from "C1" based on whether a network attack is identified. This may involve hypervisor 111 analyzing the content (e.g., header data and/or payload data) of each packet. As used herein, the term "network attack" may refer generally to an intrusion that generally exploits vulnerabilities in virtualized computing environment 100 to gain unauthorized access to system resources. Examples of a "network attack" may include denial of service (DoS), network sniffing, spoofing (e.g., IP address spoofing), flood attack (e.g., synchronization (SYN) packet flooding), ping of death, buffer overflow attack, etc. In response to detecting a network attack, the traffic flow of packets will be denied or blocked. In this case, a report may be generated and sent to management entity 160 and/or user device 170.

(4) Access Control Policies (See 1107-1108)

According to an access control policy configured for "C1," hypervisor 111 may allow or deny a traffic flow of packets originating from "C1" based on an access control list. For example, a list of permission(s) assigned to "C1" may be specified in the access control list. In response to determination that "C1" does not have a required permission, the traffic flow of packets may be denied or blocked. In this case, a report may be generated and sent to management entity 160 and/or user device 170.

(5) Packet Filtering Policies (See 1109-1112)

According to a packet filtering policy configured for "C1," hypervisor 111 may filter a traffic flow of packets originating from "C1" based on one or more filtering criteria. For example at blocks 1109-1110, packet filtering may be performed to identify whether the traffic flow includes a specific a type of packet, such as broadcast unicast multicast (BUM) packets. In another example at blocks 1111-1112, container-aware deep packet inspection may be performed to inspect the content of the traffic flow.

(6) Packet Encryption or Decryption Policies (See 1113-1114)

According to an encryption policy configured for "C1," hypervisor 111 may encrypt a traffic flow of packets originating from "C1" using an encryption key associated with "C1." Alternatively, according to a decryption policy configured for "C1," hypervisor 111 may decrypt a traffic flow of packets originating from "C1" using an decryption key associated with "C1." Any encryption or decryption technique may be used, such as digital signatures, Rivest Shamir Adleman (RSA) algorithm, etc. A traffic flow with encrypted or decrypted packets may also be referred to as a "modified" traffic flow.

(7) Packet Duplication or De-Duplication Policies (See 1115-1116)

According to a packet duplication policy configured for "C1," hypervisor 111 may generate duplicate packets based on a traffic flow of packets originating from "C1." Alternatively, according to a packet de-duplication policy configured for "C1," hypervisor 111 may identify duplicate (or similar) packet(s) in the traffic flow of packets and remove or eliminate the duplicate packet(s). A traffic flow that includes additional (duplicate) packets, or has packets removed, may be referred to as a "modified" traffic flow.

(8) Packet Tagging Policies (see 1117-1118)

According to a packet tagging policy configured for "C1," hypervisor 111 may modify header data and/or payload data of at least one packet in a traffic flow of packets originating from "C1" to add metadata associated with "C1." For example, the metadata may identify "C1" (e.g., "TAG1"), a virtual machine (e.g., "VM1") or host 110 supporting "C1," a logical network (e.g., VLAN or VXLAN) on which "C1" is located, etc.

(9) Load Balancing Policies (See 1119-1120)

According to a load balancing policy configured for "C1," hypervisor 111 may select one of multiple physical NICs 114 of host 110 to forward a traffic flow of packets originating from "C1." In this case, host 110 may include multiple physical NICs 114 (e.g., "PNIC1" and "PNIC2") configured as a NIC team to improve network throughput and fault tolerance. For example, the traffic flow will be forwarded via "PNIC1" based on tag data "TAG1" identifying "C1." On the other hand, a traffic flow originating from "C2" will be will be forwarded via "PNIC2" based on tag data "TAG2" identifying "C2." This way, load balancing may be performed to distribute traffic among the different physical NICs 114 in a fair and efficient manner.

(10) Jumbo Frame Policy (See 1121-1122)

A "jumbo frame" refers generally to Ethernet frames that exceed a certain payload size (e.g., 9000 bytes). According to a jumbo frame policy configured for "C1," hypervisor 111 may determine that jumbo frame is enabled for the container. In this case, hypervisor 111 may select a path (e.g., a path with end-to-end support for jumbo frames) for forwarding received traffic flow of packets.

It should be understood that the above policy or policies may be configured and applied to incoming packets destined for containers 141-146. In this case, blocks 1040 to 1070 in FIG. 10 and any of blocks 1101-1122 in FIG. 11 may be repeated in to receive an incoming traffic flow of packets, identify a destination container (e.g., "C1") based on content (e.g., tag data "TAG1") of the packets, retrieved a policy configured for the identified container, and handling the incoming traffic flow of packets according to the policy. In this case, the sender or source may be configured to add the relevant tag data to those packets.

The above examples can be implemented by hardware (including hardware logic circuitry), software or firmware or a combination thereof. For example, host 110 and management entity 160 may be implemented by any suitable computing device, which may include processor and memory that may communicate with each other via a bus, etc. The computing device may include a non-transitory computer-readable medium having stored thereon instructions that, when executed by the processor, cause the processor to perform processes described herein with reference to FIG. 1 to FIG. 12.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or firmware to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). For example, a computer-readable storage medium includes recordable/non recordable media (e.g., read-only memory (ROM), random access memory (RAM), magnetic disk storage media, optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

We claim:

1. A method for a computing device to perform traffic handling for a container in a virtualized computing environment, the method comprising:
   receiving a traffic flow of packets from a virtual machine;
   identifying a container from which the traffic flow originates based on content of the received traffic flow of packets, wherein the container is supported by the virtual machine;
   retrieving a policy configured for the identified container; and
   handling the received traffic flow of packets according to the policy.

2. The method of claim 1, wherein identifying the container comprises:
   parsing header data of each packet of the traffic flow to identify the container based on tag data in the header data.

3. The method of claim 2, wherein the method further comprises:
   prior to receiving the traffic flow of packets, the container or a guest agent installed on a guest operating system of the virtual machine adding the tag data to each packet.

4. The method of claim 1, wherein handling the received traffic flow of packets comprises:
   according to the policy configured for the container, performing one or more of the following actions specified by the policy: allowing or denying the received traffic flow of packets, modifying the received traffic flow of packets, determining a forwarding decision for the received traffic flow of packets, analyzing the content of the received traffic flow of packets, and generating and sending a report based on the received traffic flow of packets.

5. The method of claim 1, wherein handling the received traffic flow of packets comprises one or more of the following:
   according to a firewall policy configured for the container, allowing or denying the received traffic flow of packets based on one or more of the following tuples identified from header data of each packet: source port number, destination address, destination port number and protocol;
   according to an anti-malware policy configured for the container, allowing or denying the received traffic flow of packets based on one or more malware signatures;
   according to a network attack detection policy configured for the container, allowing or denying the received traffic flow of packets based on whether a network attack is identified;
   according to an access control policy configured for the container, allowing or denying the received traffic flow of packets based on an access control list specifying a list of one or more permissions assigned to the container;
   according to a packet filtering policy configured for the container, filtering the received traffic flow of packets based on one or more filtering criteria; and
   according to a deep packet inspection policy configured for the container, inspecting the content of the received traffic flow of packets.

6. The method of claim 1, wherein handling the received traffic flow of packets comprises one or more of the following:
   according to an encryption policy configured for the container, encrypting the received traffic flow of packets using an encryption key associated with the container;
   according to a decryption policy configured for the container, decrypting the received traffic flow of packets using a decryption key associated with the container;
   according to a packet duplication policy, generating at least one duplicate packet based on the received traffic flow of packets;
   according to a packet de-duplication policy configured for the container, removing at least one packet from the received traffic flow of packets;
   according to a packet tagging policy configured for the container, modifying header data or payload data, or both, of at least one packet in the received traffic flow to add metadata associated with the container;
   according to a load balancing policy configured for the container, selecting one of multiple physical network interface controllers (NICs) of the computing device for forwarding the received traffic flow of packets; and
   according to a jumbo frame policy configured for the container, determining that jumbo frame forwarding is enabled for the container and selecting a path for forwarding the received traffic flow of packets.

7. The method of claim 1, wherein the method further comprises:
   receiving an incoming traffic flow of packets;
   identifying the container for which the incoming traffic flow of packets is destined based on content of the incoming traffic flow of packets;

retrieving a further policy configured for the identified container; and handling the incoming traffic flow of packets according to the further policy.

8. A non-transitory computer-readable storage medium that includes a set of instructions which, in response to execution by a processor of a host, cause the processor to perform a method of traffic handling for a container in a virtualized computing environment, wherein the method comprises:

receiving a traffic flow of packets from a virtual machine;

identifying a container from which the traffic flow originates based on content of the received traffic flow of packets, wherein the container is supported by the virtual machine;

retrieving a policy configured for the identified container; and handling the received traffic flow of packets according to the policy.

9. The non-transitory computer-readable storage medium of claim 8, wherein identifying the container comprises:

parsing header data of each packet of the traffic flow to identify the container based on tag data in the header data.

10. The non-transitory computer-readable storage medium of claim 9, wherein the method further comprises:

prior to receiving the traffic flow of packets, the container or a guest agent installed on a guest operating system of the virtual machine adding the tag data to each packet.

11. The non-transitory computer-readable storage medium of claim 8, wherein handling the received traffic flow of packets comprises:

according to the policy configured for the container, performing one or more of the following actions specified by the policy: allowing or denying the received traffic flow of packets, modifying the received traffic flow of packets, determining a forwarding decision for the received traffic flow of packets, analyzing the content of the received traffic flow of packets, and generating and sending a report based on the received traffic flow of packets.

12. The non-transitory computer-readable storage medium of claim 8, wherein handling the received traffic flow of packets comprises one or more of the following:

according to a firewall policy configured for the container, allowing or denying the received traffic flow of packets based on one or more of the following tuples identified from header data of each packet: source port number, destination address, destination port number and protocol;

according to an anti-malware policy configured for the container, allowing or denying the received traffic flow of packets based on one or more malware signatures;

according to a network attack detection policy configured for the container, allowing or denying the received traffic flow of packets based on whether a network attack is identified;

according to an access control policy configured for the container, allowing or denying the received traffic flow of packets based on an access control list specifying a list of one or more permissions assigned to the container;

according to a packet filtering policy configured for the container, filtering the received traffic flow of packets based on one or more filtering criteria; and according to a deep packet inspection policy configured for the container, inspecting the content of the received traffic flow of packets.

13. The non-transitory computer-readable storage medium of claim 8, wherein handling the received traffic flow of packets comprises one or more of the following:

according to an encryption policy configured for the container, encrypting the received traffic flow of packets using an encryption key associated with the container;

according to a decryption policy configured for the container, decrypting the received traffic flow of packets using a decryption key associated with the container;

according to a packet duplication policy configured for the container, generating at least one duplicate packet based on the received traffic flow of packets;

according to a packet de-duplication policy, removing at least one packet from the received traffic flow of packets;

according to a packet tagging policy configured for the container, modifying header data or payload data, or both, of at least one packet in the received traffic flow to add metadata associated with the container;

according to a load balancing policy configured for the container, selecting one of multiple physical network interface controllers (NICs) of the computing device for forwarding the received traffic flow of packets; and according to a jumbo frame policy configured for the container, determining that jumbo frame forwarding is enabled for the container and selecting a path for forwarding the received traffic flow of packets.

14. The non-transitory computer-readable storage medium of claim 8, wherein the method further comprises:

receiving an incoming traffic flow of packets;

identifying the container for which the incoming traffic flow of packets is destined based on content of the incoming traffic flow of packets;

retrieving a further policy configured for the identified container; and handling the incoming traffic flow of packets according to the further policy.

15. A computing device configured to perform traffic handling for a container in a virtualized computing environment, the computing device comprising:

a processor; and a non-transitory computer-readable medium having stored thereon instructions that, when executed by the processor, cause the processor to:

receive a traffic flow of packets from a virtual machine;

identify a container from which the traffic flow originates based on content of the received traffic flow of packets, wherein the container is supported by the virtual machine;

retrieve a policy configured for the identified container; and handle the received traffic flow of packets according to the policy.

16. The computing device of claim 15, wherein the instructions for identifying the container cause the processor to:

parse header data of each packet of the traffic flow to identify the container based on tag data in the header data.

17. The computing device of claim 16, wherein the instructions further cause the processor to:
prior to receiving the traffic flow of packets, the container or a guest agent installed on a guest operating system of the virtual machine adding the tag data to each packet.

18. The computing device of claim 15, wherein the instructions for handling the received traffic flow of packets cause the processor to:
according to the policy configured for the container, perform one or more of the following actions specified by the policy: allow or deny the received traffic flow of packets, modify the received traffic flow of packets, determine a forwarding decision for the received traffic flow of packets, analyze the content of the received traffic flow of packets, and generate and send a report based on the received traffic flow of packets.

19. The computing device of claim 15, wherein the instructions for handling the received traffic flow of packets cause the processor to one or more of the following:
according to a firewall policy configured for the container, allow or deny the received traffic flow of packets based on one or more of the following tuples identified from header data of each packet: source port number, destination address, destination port number and protocol;
according to an anti-malware policy configured for the container, allow or deny the received traffic flow of packets based on one or more malware signatures;
according to a network attack detection policy configured for the container, allow or deny the received traffic flow of packets based on whether a network attack is identified;
according to an access control policy configured for the container, allow or deny the received traffic flow of packets based on an access control list specifying a list of one or more permissions assigned to the container;
according to a packet filtering policy configured for the container, filter the received traffic flow of packets based on one or more filtering criteria; and
according to a deep packet inspection policy configured for the container, inspect the content of the received traffic flow of packets.

20. The computing device of claim 15, wherein the instructions for handling the received traffic flow of packets cause the processor to one or more of the following:
according to an encryption policy configured for the container, encrypt the received traffic flow of packets using an encryption key associated with the container;
according to a decryption policy configured for the container, decrypt the received traffic flow of packets using a decryption key associated with the container;
according to a packet duplication policy configured for the container, generate at least one duplicate packet based on the received traffic flow of packets;
according to a packet de-duplication policy configured for the container, remove at least one packet from the received traffic flow of packets;
according to a packet tagging policy configured for the container, modify header data or payload data, or both, of at least one packet in the received traffic flow to add metadata associated with the container;
according to a load balancing policy configured for the container, select one of multiple physical network interface controllers (NICs) of the computing device for forwarding the received traffic flow of packets; and
according to a jumbo frame policy configured for the container, determine that jumbo frame forwarding is enabled for the container and select a path for forwarding the received traffic flow of packets.

21. The computing device of claim 15, wherein the instructions further cause the processor to:
receive an incoming traffic flow of packets;
identify the container for which the incoming traffic flow of packets is destined based on content of the incoming traffic flow of packets;
retrieve a further policy configured for the identified container; and
handle the incoming traffic flow of packets according to the further policy.

* * * * *